United States Patent
Aher et al.

(10) Patent No.: US 11,184,675 B1
(45) Date of Patent: Nov. 23, 2021

(54) SYSTEMS AND METHODS TO IMPROVE SKIP FORWARD FUNCTIONALITY

(71) Applicant: Rovi Guides, Inc., San Jose, CA (US)

(72) Inventors: Ankur Anil Aher, Maharashtra (IN); Charishma Chundi, Andhra Pradesh (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/897,614

(22) Filed: Jun. 10, 2020

(51) Int. Cl.
*H04N 21/472* (2011.01)
*H04N 21/45* (2011.01)
*H04N 21/845* (2011.01)
*H04N 21/6587* (2011.01)

(52) U.S. Cl.
CPC ... *H04N 21/47217* (2013.01); *H04N 21/4532* (2013.01); *H04N 21/6587* (2013.01); *H04N 21/8456* (2013.01)

(58) Field of Classification Search
CPC ......... H04N 21/47217; H04N 21/4532; H04N 21/8456; H04N 5/783; G11B 27/005; G06F 16/745
See application file for complete search history.

(56) References Cited

U.S. PATENT DOCUMENTS

| | | | |
|---|---|---|---|
| 7,127,152 B2 | 10/2006 | Van | |
| 7,904,814 B2 * | 3/2011 | Errico | G11B 27/005 715/725 |
| 8,875,023 B2 * | 10/2014 | Cronin | G06F 3/04847 715/723 |
| 8,881,010 B2 * | 11/2014 | Soldan | G11B 27/34 715/720 |
| 8,990,861 B2 * | 3/2015 | Nishikawa | H04N 21/4325 725/52 |
| 9,363,579 B2 * | 6/2016 | Frumar | G06F 3/0482 |
| 9,961,403 B2 * | 5/2018 | Kritt | H04N 21/266 |
| 2002/0012526 A1 * | 1/2002 | Sai | H04N 21/47 386/241 |
| 2002/0075572 A1 * | 6/2002 | Boreczky | H04N 21/431 359/722 |

(Continued)

FOREIGN PATENT DOCUMENTS

EP      1469476 A1      10/2004

OTHER PUBLICATIONS

U.S. Appl. No. 16/897,616, filed Jun. 10, 2020, Ankur Anil Aher.
U.S. Appl. No. 16/897,618, filed Jun. 10, 2020, Ankur Anil Aher.

*Primary Examiner* — Heather R Jones
(74) *Attorney, Agent, or Firm* — Haley Guiliano LLP

(57) ABSTRACT

Systems and methods are described to identify jump points indicative of potential time points from which to resume consumption of the media asset in response to receiving a request to skip a portion of a media asset being consumed. The jump points include a first jump point identified based on a content viewing profile and a second jump point identified based on a scene information associated with the media asset. A preview image is displayed at each of the identified jump points. Systems and methods are also described to pause the skipping operation at the identified jump points and provide a preview at the respective jump points. Systems and method are further described to identify jump points based on analysis of the portion of the media asset being skipped.

18 Claims, 10 Drawing Sheets

(56) References Cited

U.S. PATENT DOCUMENTS

| | | | |
|---|---|---|---|
| 2002/0108112 A1* | 8/2002 | Wallace | G11B 27/28 725/40 |
| 2003/0093790 A1* | 5/2003 | Logan | G11B 27/34 725/38 |
| 2003/0122966 A1* | 7/2003 | Markman | H04N 21/47214 348/563 |
| 2003/0126599 A1* | 7/2003 | Novak | H04N 21/47214 725/32 |
| 2004/0197088 A1* | 10/2004 | Ferman | H04N 21/426 386/251 |
| 2005/0047681 A1* | 3/2005 | Hori | G06F 16/78 382/305 |
| 2005/0097135 A1* | 5/2005 | Epperson | H04N 21/4316 |
| 2005/0188408 A1 | 8/2005 | Wallis et al. | |
| 2007/0201818 A1* | 8/2007 | Choi | H04N 5/76 386/241 |
| 2008/0016089 A1* | 1/2008 | Nishiyama | G11B 27/34 |
| 2008/0107402 A1 | 5/2008 | Angiolillo et al. | |
| 2008/0317433 A1 | 12/2008 | Hamada | |
| 2009/0116817 A1* | 5/2009 | Kim | H04N 5/44513 386/241 |
| 2010/0002013 A1* | 1/2010 | Kagaya | G09G 5/38 345/619 |
| 2010/0150520 A1* | 6/2010 | Hopwood | G11B 27/34 386/278 |
| 2010/0172627 A1 | 7/2010 | Ohki et al. | |
| 2012/0087639 A1* | 4/2012 | Kawaguchi | H04N 21/83555 386/252 |
| 2013/0322848 A1* | 12/2013 | Li | H04N 5/783 386/241 |
| 2014/0105575 A1 | 4/2014 | Nishikawa et al. | |
| 2014/0181667 A1 | 6/2014 | Chen et al. | |
| 2014/0186009 A1 | 7/2014 | Cudak et al. | |
| 2014/0366065 A1 | 12/2014 | Hattori et al. | |
| 2016/0147774 A1* | 5/2016 | Xiao-Devins | G06F 16/438 707/722 |
| 2016/0148650 A1* | 5/2016 | Laksono | G06K 9/00718 386/230 |
| 2016/0219306 A1 | 7/2016 | Pettersson et al. | |
| 2017/0006252 A1 | 1/2017 | Patel et al. | |
| 2017/0085957 A1 | 3/2017 | Wong | |
| 2017/0336955 A1 | 11/2017 | Cho | |
| 2017/0366859 A1 | 12/2017 | Chimayan et al. | |
| 2018/0206004 A1 | 7/2018 | Joong et al. | |
| 2018/0316962 A1* | 11/2018 | Prakash | H04N 21/47217 |
| 2019/0146651 A1* | 5/2019 | Williams | G06F 3/0485 715/720 |
| 2020/0097731 A1* | 3/2020 | Gupta | G06K 9/00744 |
| 2020/0128294 A1 | 4/2020 | Gupta et al. | |
| 2020/0213676 A1 | 7/2020 | Raikar et al. | |
| 2021/0185400 A1 | 6/2021 | Singh et al. | |

* cited by examiner

| Scene 1 | Scene 2 | Scene 3 | Scene 4 | Scene 5 | Scene 11 | Scene 12 | Scene 13 |
|---|---|---|---|---|---|---|---|
| # Frames - 10 Genre: Action | # Frames - 14 Genre: Action | # Frames - 11 Genre: Action | # Frames - 21 Genre: Mystery | # Frames - 5 Genre: Comedy | # Frames - 7 Genre: Comedy | # Frames - 10 Genre: Mystery | # Frames - 17 Genre: Mystery |

FIG. 9

| Scene 1 | Scene 2 | Scene 3 | Scene 4 | Scene 5 | Scene 11 | Scene 12 | Scene 13 |
|---|---|---|---|---|---|---|---|
| Tags : Winterfell Genre: Action | Tags : Winterfell Genre: Action | Tags : Winterfell Genre: Action | Tags : Winterfell Genre: Mystery | Tags : Dorne Genre: Comedy | Tags : Dorne Duration: Comedy | Tags : Kings Landing Genre: Comedy | Tags : Kings Landing Genre: Mystery |

FIG. 10

SYSTEMS AND METHODS TO IMPROVE SKIP FORWARD FUNCTIONALITY

BACKGROUND

The present disclosure relates to media play systems and methods, and more particularly, to systems and methods related to media play operations.

SUMMARY

Audio and video media devices, such as dedicated recorders, televisions, and more recently, handheld devices (e.g., smartphones and tablets) offer their users the flexibility to perform various media content manipulation options such as being able to fast forward or rewind through content. Conventionally, users can use an adjustable skip time feature, such as an adjustable skip button, to manipulate through content. Consider a media player with a conventional time lapse or skip button feature(s) that enables a user to skip (forward or backward) through a video or audio recording by seconds and/or minutes.

Currently, a source of user frustration is burdensome skip feature activation to navigate a media content backward or forward. In some cases, the user is required to repeatedly depress, tap, or press on a skip button before reaching an intended media content destination (a desired play position)—an interesting portion of the media content, for example, the end of a previously consumed media content episode or an end of a current scene. One source of user frustration stems from the user not knowing where the portions of the media content that would be of interest to the user begin. Therefore, users are often forced to aimlessly skip forward and/or backward until they chance upon a desired portion of the media asset.

In some devices, a skip (time) option is displayed on a screen display of a corresponding media device (e.g., laptop) as an overlay on the media content (e.g., video), iconically appearing with an encircled double arrowhead pointers. Typically, two skip buttons, one on either side of the play button, allowed the user to skip a media content forward or backward by a fixed time period. For instance, a one-time skip button touch on the left side of the play button skips the media content backward by a standard 5 seconds or 10 seconds, and on-time skip button touch on the right side of the play button skips the media content forward by a standard 5 or 10 seconds. If the user desires to skip through a non-standard short media content duration to reach the desired play position, such as 2 seconds, the skip buttons prove frustrating because they are restrained by a 5-second or 10-second fixed granularity.

Lack of adequate skip time granularity can further contribute to adverse user experience when navigating relatively longer media content. For example, if the user wishes to skip ahead by 20 minutes using a 10-second pre-configured skip button, the user must touch the skip button an impractical 120 number of times (120 min=20 min×60 secs/10) before reaching the intended play position, a cumbersome experience indeed. User frustration also stems, at least in part, from the lack of proportionality between the current play position (e.g., in an episode of Game of Thrones) and the total media content play time (e.g., the entire length of an episode of Game of Thrones). In other words, the skip time amount granularity remains constant without regard to media content duration. A 2-second skip time feature may not be ideal for a 1-hour (total) audio and/or video duration, where the user wishes to reach a desired portion of the media asset towards the end of the video duration. Similarly, a 5-minute skip time feature may not ideal when the user only wishes to skip to the end of the scene currently being displayed.

In summary, whereas media content consumers are sure to enjoy the experience of navigating to a desired media content play destination with speed, accuracy, flexibility and ease, they are instead met with inconvenient media operations features, such as multiple button or tab clicks and seekbar slides with compromised speeds and accuracy.

Media content manipulation mechanisms, techniques, and systems are introduced to facilitate convenient, rapid, and precise media content skip time outcomes of media device content. As used herein, the term "media device" is synonymous with "media content equipment."

In some disclosure systems, potential desired play positions (for example, in an episode of Game of Thrones) in the media content (Game of Thrones Series) are identified. The potential desired play position (i.e., jump points) are places in the media content from which the user desires to start to consume or resume consuming the media content. Continuing with the Game of Thrones example, a user may wish to skip past portions of the episode featuring a particular location such as Dome. In an example application, a number of jump points are identified starting from a play position after the scenes based in Dome end. The jump points may be identified based on a content viewing profile (for example, if members of the household always skip past the scenes featuring Dome and resumes consuming the episode when the location moves to Kings Landing, a jump point is identified at the play position where the episode begins featuring Kings Landing). The jump points may also be identified based on a scene information (for example, if the user always skips past the scenes featuring Dome, a jump point is identified at the play position where the scenes featuring Dome ends). A progress bar indicating the plurality of identified jump points is displayed to make it easy for the user to navigate to a desired play position.

In some embodiments, potential desired play positions in the media content are identified based on a characteristic associated with the portion of the media asset being skipped. Continuing the with the Game of Thrones example, the system analyzes the characteristics associated with a scene being displayed at the current play position. In an instance, the system may identify characteristics such as location information (for example, Dome, Winterfell, etc.,) actor information (for example, Kit Harrington, Sophie Turner, etc.) or genre information (for example, song, violence, nudity, etc.). If the user performs a skip forward operation every time the episode features violence, the identified jump points begin at a frame position where the scenes featuring violence ends.

In an additional embodiment, the system analyzes the potential desired play positions based on a requested rate of skip (forward or backward) operation. For example, if the user skips forward using the 2-second skip feature, the system identifies jump points in the immediate vicinity of the current play position (e.g., within 10 minutes of the current play position). On the other hand, if the user skips forward using the 5-minute skip feature, the system identifies jump points towards the latter part of the media content duration (e.g., beginning at a position 20 minutes after the current play position).

In one embodiment, the skip (forward or backward) operations are paused at potential desired play positions in the media content when the user desires to skip through a non-standard short media content duration to reach the desired play position. For example, if the user touches skip button on the right side of the play button to skip the media content forward by a standard 2 minutes or 4 minutes, when the desired play positions (for example, scenes featuring the location Kings Landing) begins at a play position 5 minutes away from the current play position, conventional systems may skip past the desired play position and require the user to skip backward. In contrast, the systems and techniques disclosed here pause at jump points (identified based on user profile and/or scene information). This allows the user to select the identified jump point and resume consuming the media content at the desired play position without requiring multiple skip operations.

In some embodiments, a preview image and/or audio clip is displayed at each of the identified jump points to allow the user to easily identify and navigate to the desired play positions. When the user selects one of the displayed preview images and/or audio clips, the media content resumes display from the selected position.

In some embodiments, the jump points identified based on a content viewing profile (e.g., based on viewing behavior of members in a household) are visually distinguished from jump points based on scene information. For example, jump points identified based on the content viewing profile associated with the user making the request may be highlighted in green while jump points identified based on scene information may be highlighted in red, in accordance with disclosed methods and embodiments.

BRIEF DESCRIPTION OF THE DRAWINGS

The above and other objects and advantages of the disclosure will be apparent upon consideration of the following detailed description, taken in conjunction with the accompanying drawings, in which:

FIG. 9 illustrates an example scene metadata including frame information, in accordance with disclosed methods and embodiments;

FIG. 10 illustrates another example scene metadata including genre information, in accordance with disclosed methods and embodiments.

DETAILED DESCRIPTION

Figure 1:
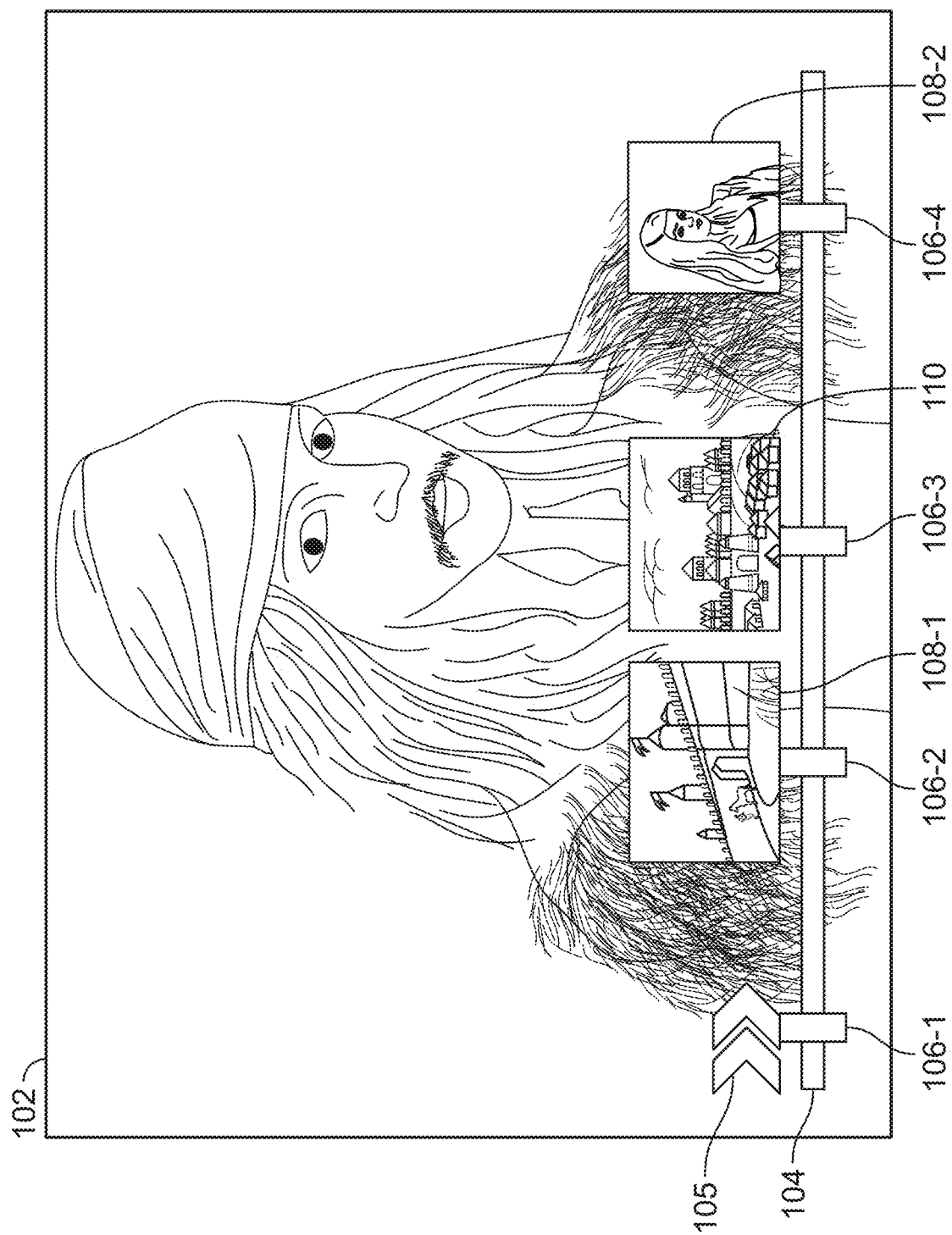
FIG. 1 illustrates an example media content skip operation screen display, in accordance with disclosed methods and systems.

FIG. 1 illustrates an example media content skip operation screen display, in accordance with disclosed methods and systems. In FIG. 1, a media content skip operation screen display is configured as a media content skip operation screen display 102. A progress bar 104 indicates a plurality of play positions 106 including current play position 106-1. The user may wish to skip to a desired portion of the media content. For example, the user, while using a touchscreen device such as a tablet, may tap on the skip forward operation button 105. In response, a plurality of jump points 106-2-4 in the media asset are identified (collectively 106). In conventional systems, a skip-forwarding operation results in cycling through the content at a uniform rate (e.g., 4-minute duration). This results in fast-forwarding (or rewinding) past the desired portions of the content, thereby requiring multiple skip-operations.

To address the above-noted concerns, the present disclosure identifies a number of jump points indicative of potential time points within the media asset from which the user may wish to resume consuming the media asset. A first jump point (for example, jump points 106-2 and 106-4) is identified based on a content viewing profile. For instance, the system retrieves the content viewing profile associated with a user making the skip forwarding request and determine one or more user preferences based on the retrieved content viewing profile. In an embodiment, the system may consider the viewing preferences of all members of a household when determining the one or more user preferences. Continuing with the Game of Thrones example, if the user always skips past the scenes featuring the character Jon Snow and resumes consuming the episode when the location moves to Kings Landing, a jump point is identified at the play position where the episode begins featuring Kings Landing. In accordance with disclosed methods and embodiments, the system identifies jump point 106-3 based on the determined one or more user preferences for scenes featuring Kings Landing. In some embodiments, the disclosed methods may determine user preferences for characters (e.g., Jon Snow, Cersei Lannister, etc.), locations (e.g., the Wall, Winterfell, Dome, Kings Landing, etc.), or genre (e.g., violence, nudity, etc.) when determining potential jump points.

In some embodiments, the media asset (an episode of Game of Thrones) is a part of a series of media assets (the series Game of Thrones). The disclosed methods and embodiments retrieve the content viewing profile associated with other media assets of the series of media assets when determining potential jump points.

A second jump point (for example, jump point 106-3) is identified based on a scene information associated with the media asset. For example, the disclosed methods and embodiments involve retrieving scene metadata associated with a scene being displayed at a first time point when the request to skip the portion of the media asset being generated for display is received. For example, scene metadata at the play position 106-1 is retrieved (additional details regarding scene metadata is discussed below in connection with FIGS. 9 and 10). Based on the retrieved scene metadata, the second time point when the scene is scheduled to end is determined (for example, time point 106-3) and the second jump point is displayed at the determined second time point. In accordance with some embodiments, the end of the scene may be determined based on a change in characters, locations, or genre. In accordance with an embodiment, the second jump point 106-3 precedes the determined second time point (corresponding to the end position of the scene) to provide the user some context for the upcoming scene.

Once the jump points 106 are identified, they are displayed on progress bar 104. In accordance with some embodiments, a respective preview image associated with each of the identified jump point is generated for display. For example, respective preview images 108-1, 108-2, and 110 are displayed next to identified jump points 106-2, 106-3, and 106-4 respectively on progress bar 104.

In accordance with some embodiments, the first jump point is visually distinguished from the second jump point on the progress bar. For example, preview image 110 (associated with the second jump point) is surrounded by a white highlight while preview images 108-1 and 108-2 (associated with the first jump points) are not. In some embodiments, a respective preview video clip associated with each of the identified jump point is generated instead of merely an image.

Disclosed systems and methods further include, when generating the respective preview image associated with each of the identified jump point, selecting a frame of the media asset corresponding to the identified jump point and displaying the selected frame as the preview image. For example, the system identifies the frame corresponding to play positions 106-2, 106-3, and 106-4 and displays the identified frame as the preview image.

Figure 2A:
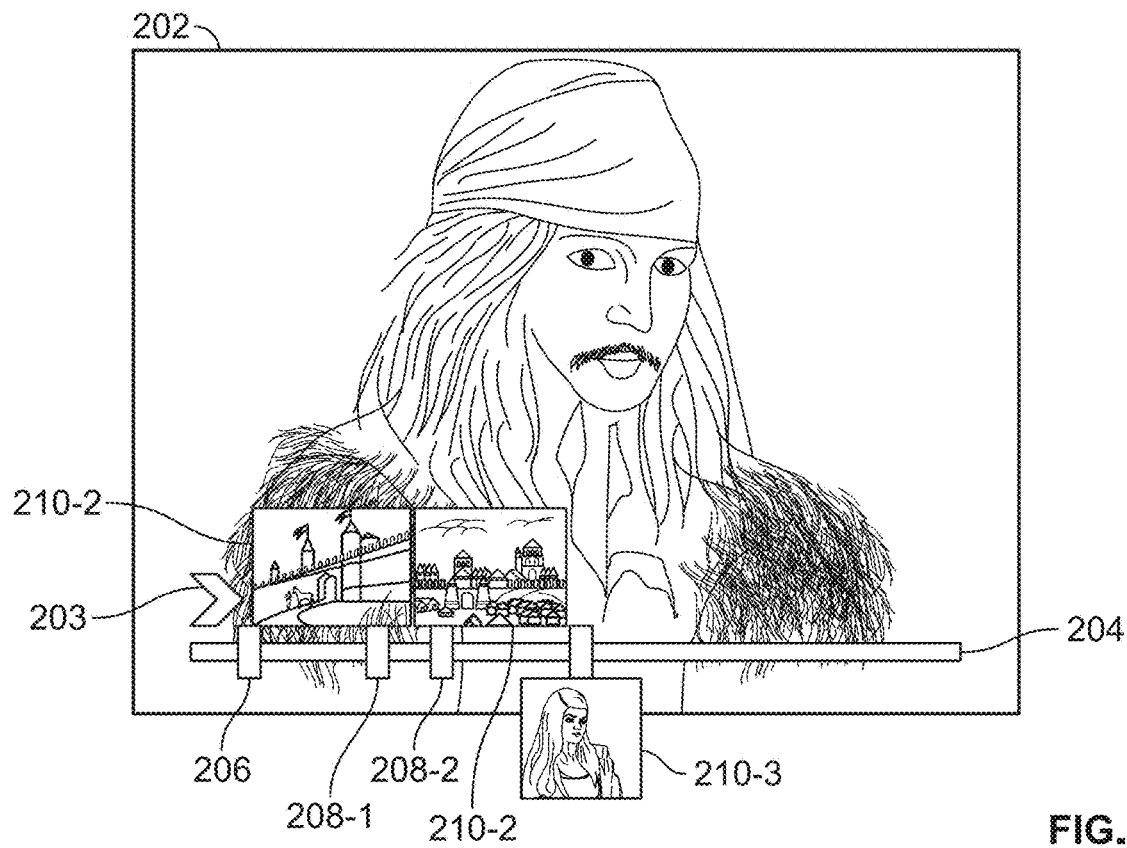
FIGS. 2A and 2B illustrate another example media content skip operation screen display, in accordance with disclosed methods and systems.
Figure 2B:
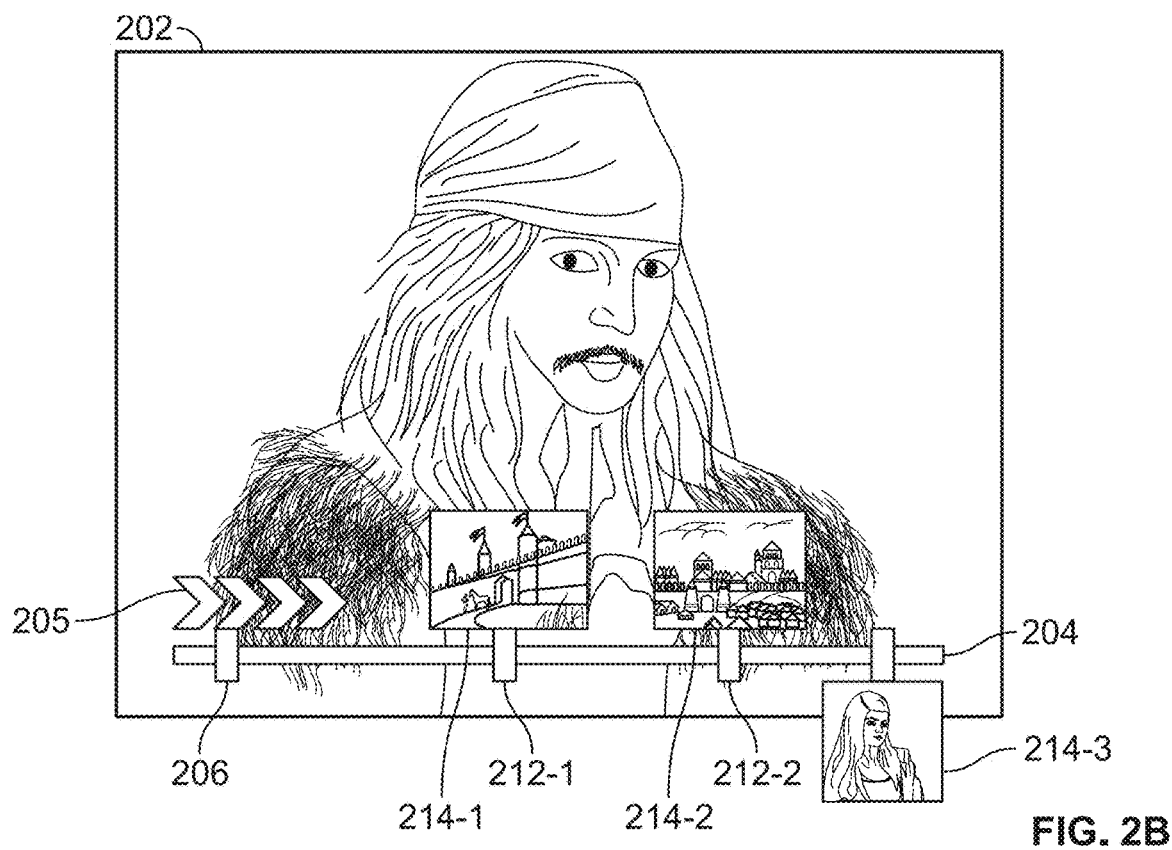

FIGS. 2A and 2B illustrate another example media content skip operation screen display, in accordance with disclosed methods and systems. Specifically, FIG. 2A illustrates an example media content skip operation screen display where the requested rate of change is low while FIG. 2B illustrates an example media content skip operation screen display where the requested rate of change is high.

In FIG. 2A, a media content skip operation screen display is configured as a media content skip operation screen display 202. A progress bar 204 indicates a current play position 206-1. The user may wish to skip to a desired portion of the media content. For example, the user, while using a touchscreen device such as a tablet, may tap on the skip forward operation button 203 at a first rate (e.g., 30-second skip forward operation). In response, a plurality of jump points 208-1, 208-2, etc. are identified in the media asset (collectively 208). As illustrated in FIG. 2A, because the requested rate of change associated with the skip forward request is low (e.g., 30-second skip forward operation), jump points 208 are identified in the immediate vicinity of the current play position 206 because it is assumed that the user wants to skip smaller chunks of the media asset based on the requested lower rate.

In another embodiment illustrated in FIG. 2B, the user, while using a touchscreen device such as a tablet, may tap on the skip forward operation button 203 at a high rate (e.g., 4-minute skip forward operation). In response, a plurality of jump points 212-1, 212-2, etc. are identified in the media asset (collectively 212) towards the end of the media asset duration. As illustrated in FIG. 2B, because the requested rate of change associated with the skip forward request is high (e.g., 4-minute skip forward operation), jump points 212 are identified in the latter portion of the media asset duration because it is assumed that the user wants to skip larger chunks of the media asset based on the requested higher rate.

Once the jump points 208, 212 are identified, they are displayed on progress bar 204. In accordance with some embodiments, a respective preview image associated with each of the identified jump point is generated for display. For example, preview images 210-1, 210-2, and 210-3 are displayed next to identified jump points 208-1, 208-2, and 208-3 respectively on progress bar 204 in FIG. 2A, while preview images 214-1, 214-2, and 214-3 are displayed next to identified jump points 212-1, 212-2, and 212-3 respectively on progress bar 204 in FIG. 2B. In some embodiments, a respective preview video clip associated with each of the identified jump point is generated instead of merely an image.

Disclosed systems and methods further include, when generating the respective preview image associated with each of the identified jump point, selecting a frame of the media asset corresponding to the identified jump point and displaying the selected frame as the preview image. For example, the system identifies the frame corresponding to play positions 212-1, 212-2, and 212-3 and displays the identified frame as the preview image 214-1, 214-2, and 214-3 respectively.

Figure 3:
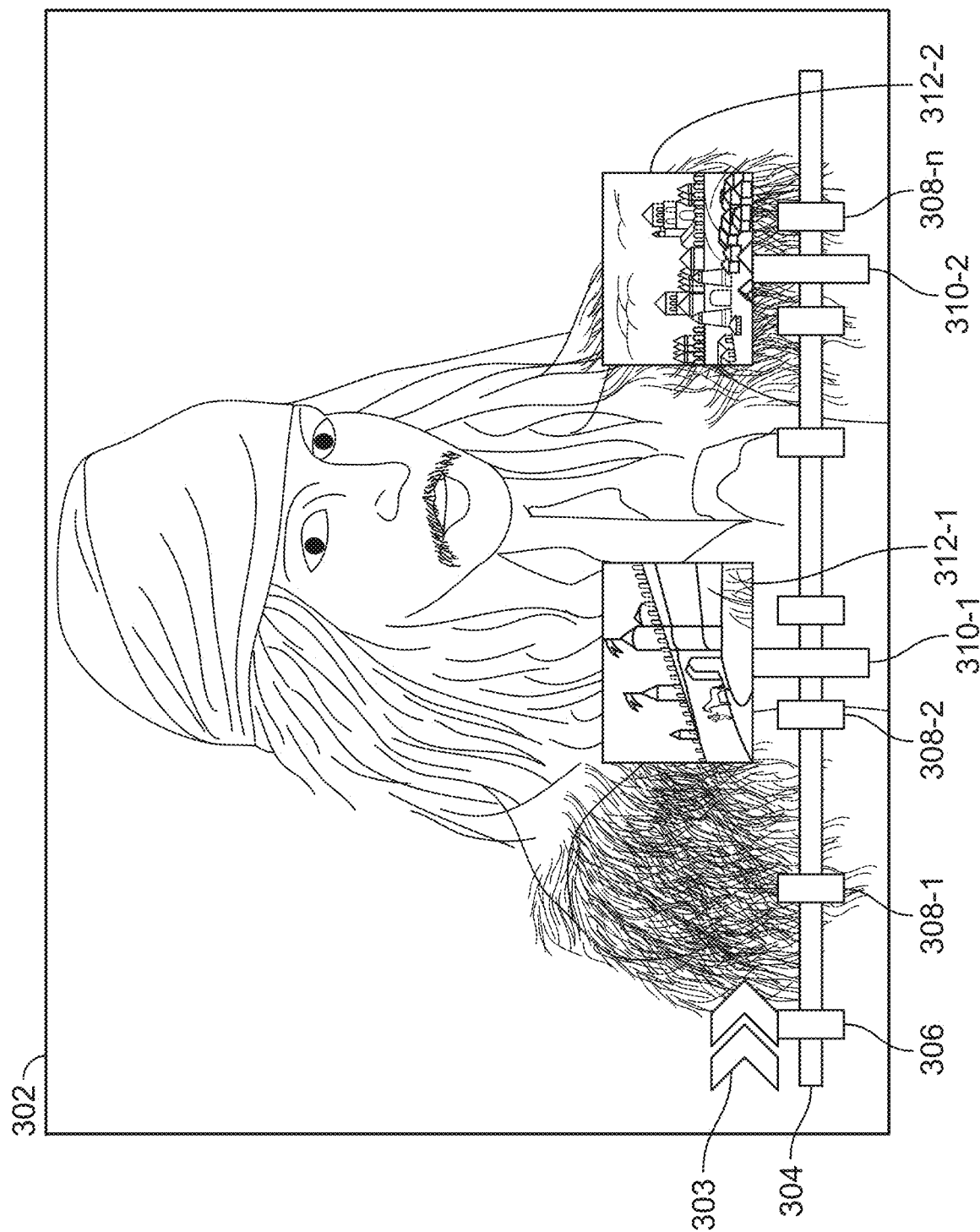
FIG. 3 illustrates another example media content skip operation screen display, in accordance with disclosed methods and systems.

FIG. 3 illustrates another example media content skip operation screen display, in accordance with disclosed methods and systems. In FIG. 3, a media content skip operation screen display is configured as a media content skip operation screen display 302. A progress bar 304 indicates a current play position 306. The user may wish to skip to a desired portion of the media content at a first rate. For example, the user, while using a touchscreen device such as a tablet, may tap on the skip forward operation button 303 corresponding to a 4-minute skip forward operation. Based on the requested rate, the system determines a plurality of uniformly spaced time points 308 (for example, spaced 4 minutes apart).

In addition, the system identifies a plurality of jump points 310 based on a content viewing profile. For example, if the user always skips to scene featuring the location Winterfell in previous episodes of Game of Thrones, the system identifies jump points 310-1 and 310-2 based on the user's content viewing profile. Of note, jump points 310-1 and 310-2 are not positioned at the standard 4-minute intervals. Jump points 310-1 and 310-2 may be identified based on content viewing profile and/or scene characteristics. For instance, jump point 310-1 may be identified based on content viewing behavior of the user when viewing previous episodes of Game of Thrones (for example, the user always skips scenes featuring the location Dome). Additionally, jump point 310-2 may be identified based on scene characteristics (for example, the scene may end at a non-uniform (i.e., at a time interval that doesn't fall at 4-minute interval from the current play position).

When the skipping operation is performed, the process begins by skipping along the uniformly spaced time points 308 at 4-minute intervals. When an identified jump point (for example, 310-1) falls in between two of the determined time points, the skipping operation is paused. In some embodiments, a preview image and/or video is displayed for the user. In some embodiments, the skipping operation may be paused for a duration of approximately 2 seconds. This allows the user to review the preview clip and make a selection. The user may decide to resume consuming the media asset or continue the skipping operation along the determined time points.

As discussed above, conventionally, a skip operation allows for jumping forward or backward at a uniform rate (e.g., 4-minute duration). However, a desired scene may begin at a location that does not correspond to the uniform rate (e.g., at a location 15 minutes away). In such instances, the user is forced to skip backward after performing a skip-forward operation. In contrast, the disclosed systems and methods identify jump points and display corresponding preview images at all potential desired location. In this way, the user can more efficiently reach the desired portion of the media asset without having to perform multiple skip backward and forward operations.

Figure 4:
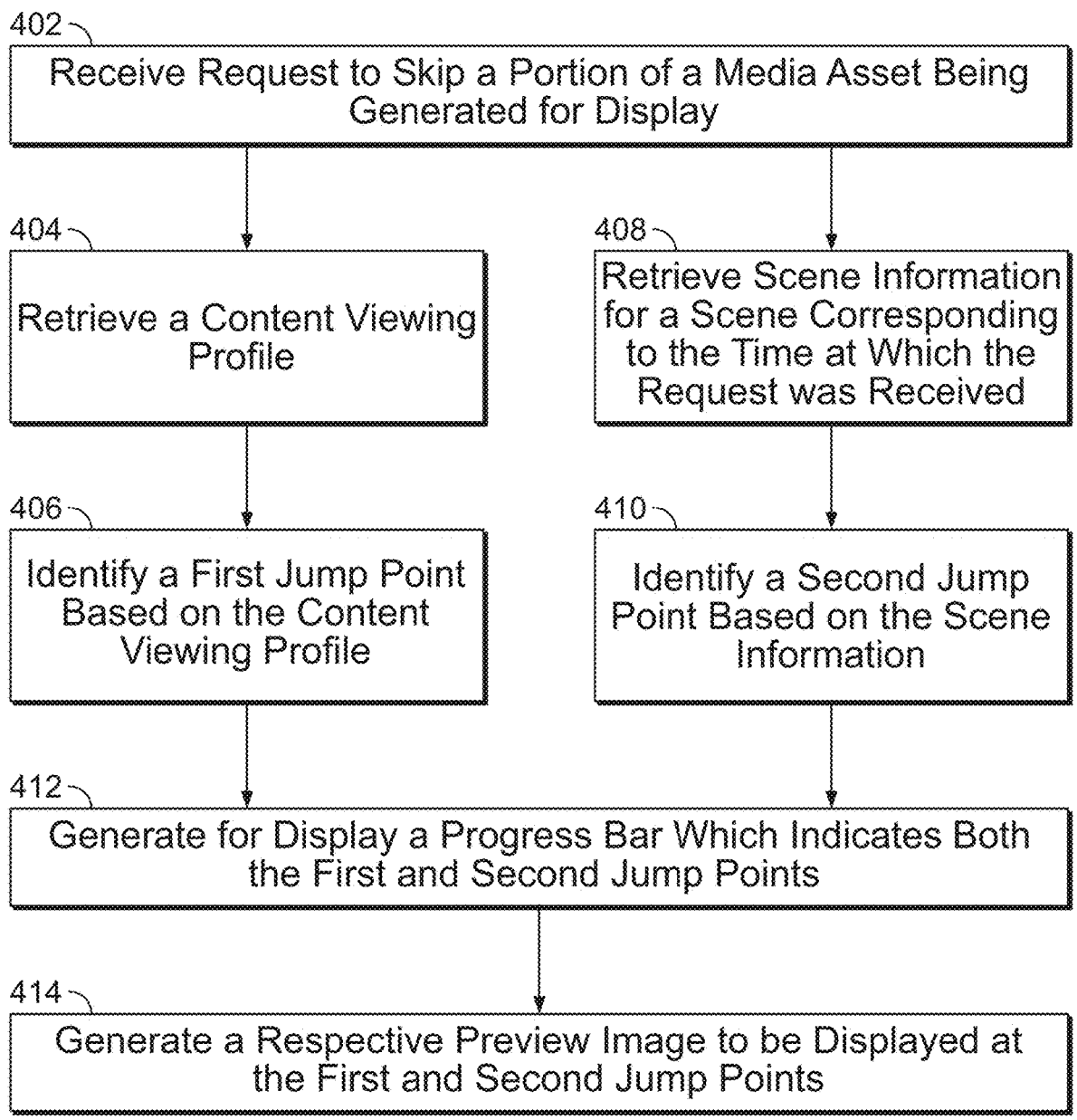
FIG. 4 depicts an illustrative flowchart of a jump point identification process, in accordance with disclosed methods and embodiments.

FIG. 4 depicts an illustrative flowchart of a jump point identification process, in accordance with disclosed methods and embodiments. It should be noted that process 400 or any step thereof could be performed on, or provided by, any of the devices shown in FIG. 11 and can incorporate various user interfaces (e.g., displays screens of FIGS. 1-3). For example, process 400 may be executed by control circuitry 1128 (FIG. 11) of the user equipment 1118 and/or control circuitry of the media content item server 1102, as instructed by an application which may be implemented on media content item server 1102. In addition, one or more steps of process 400 may be incorporated into or combined with one or more steps of any other process or embodiment (e.g., process 500 of FIG. 5, process 600 of FIG. 6, process 700 of FIG. 7, process 800 of FIG. 8).

At 402, a request is received from a user to skip a portion of a media asset being generated for display. For example, a user decides to skip a portion of an episode of Game of Thrones. At 404, the system retrieves a content viewing profile associated with the user (and/or members of the household). At 406, the system determines a first jump point based on the retrieved content viewing profile of the user. For example, the system determines that the user has always skipped past scenes featuring a lot of violence and been highly engaged with scenes featuring a lot of mystery. Accordingly, a first jump point is determined to be at a portion of the media asset having scenes featuring a lot of mystery.

At 408, the system retrieves scene information for the scene corresponding to the current play position. At 410, the system determines a second jump point based on the retrieved scene information. For example, the system determines that the scene corresponding to the current play position features the location Winterfell and determines that the second jump point is at the scene featuring Kings Landing. At 412, the system generates for display a progress bar which indicates the first and second jump points. As shown in FIG. 1, progress bar 104 shows identified jump points 106. At 414, the system generates for a respective preview image to be displayed at the identified jump points. For example, as shown in FIG. 1, preview images 108 are displayed at the identified jump points 106, thereby allowing the user to easily navigate to a desired portion of the media asset.

Figure 5:
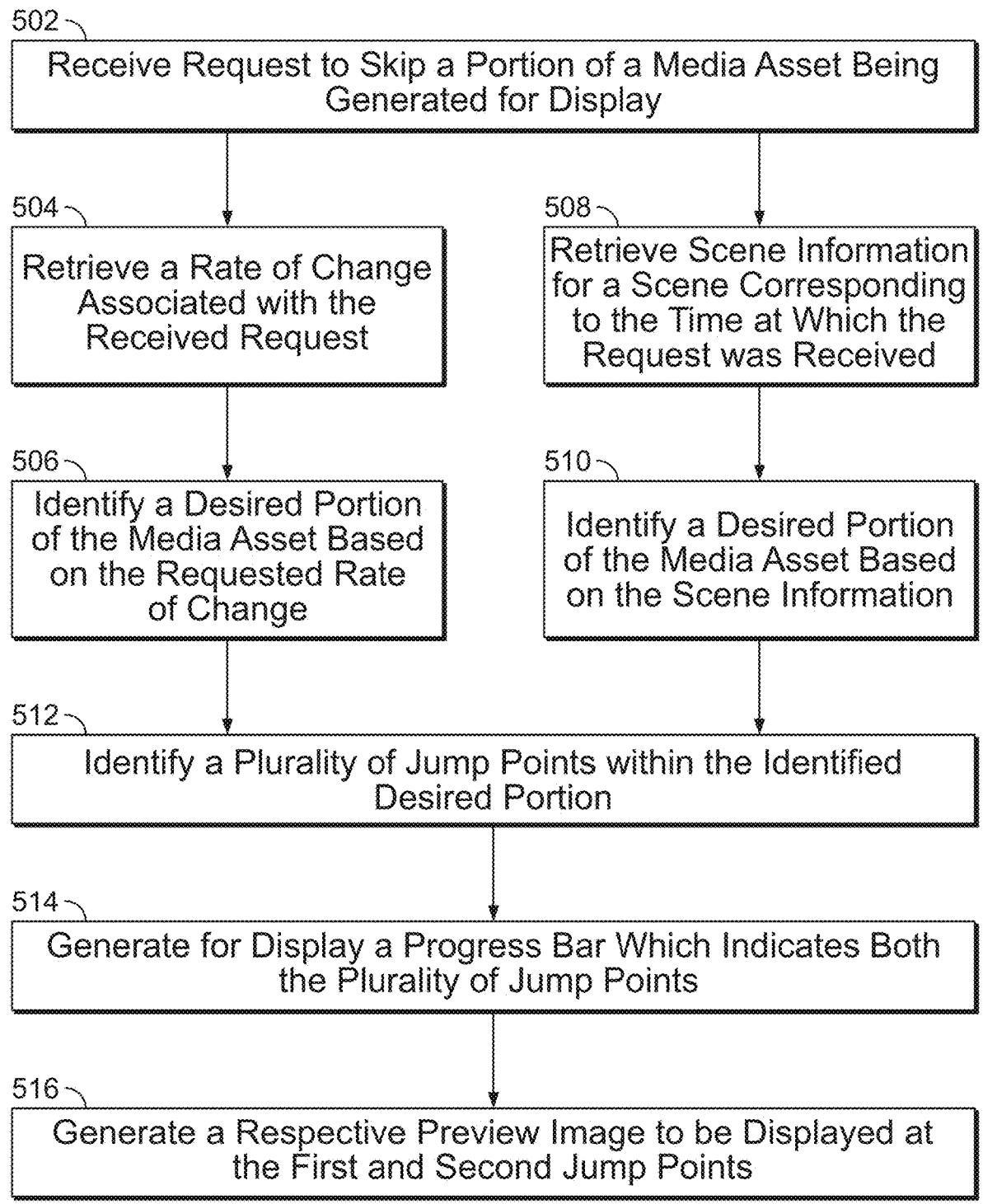
FIG. 5 depicts another illustrative flowchart of a jump point identification process, in accordance with disclosed methods and embodiments.

FIG. 5 depicts another illustrative flowchart 500 of a jump point identification process, in accordance with disclosed methods and embodiments. It should be noted that process 500 or any step thereof could be performed on, or provided by, any of the devices shown in FIG. 11 and can incorporate various user interfaces (e.g., displays screens of FIGS. 1-3). For example, process 500 may be executed by control circuitry 1128 (FIG. 11) of the user equipment 1118 and/or control circuitry of the media content item server 1102, as instructed by an application which may be implemented on media content item server 1102. In addition, one or more steps of process 500 may be incorporated into or combined with one or more steps of any other process or embodiment (e.g., process 400 of FIG. 4, process 600 of FIG. 6, process 700 of FIG. 7, process 800 of FIG. 8).

At 502, a request is received from a user to skip a portion of a media asset being generated for display. For example, a user decides to skip a portion of an episode of Game of Thrones. At 504, the system retrieves a rate of change associated with the received request. At 506, the system determines a desired portion of the media asset based on the requested rate of change. For example, the system determines that the user has requested a 30-second minute skip forward operation and determines that the desired portion of the media asset is in the immediate vicinity of the current play position. If, for instance, the system determines that the user has requested a 5-minute minute skip forward operation and determines that the desired portion of the media asset is in towards the end of the media duration.

At 508, the system retrieves scene information for the scene corresponding to the current play position. At 510, the system determines a desired portion of the media asset based on the retrieved scene information. For example, the system determines that the scene corresponding to the current play position features the location Winterfell and determines that the desired portion of the media asset begins from a scene featuring Kings Landing. At 512, the process proceeds to identifying a plurality of jump points within the identified desired portion of the media asset. For example, as shown in FIGS. 2A and 2B, the identified jump points 208 are identified based on the requested rate of change and/or the scene information.

At 514, the system generates for display a progress bar which indicates the plurality of jump points. As shown in FIGS. 2A and 2B, progress bar 204 shows identified jump points 208-1-208-3. At 516, the system generates for a respective preview image to be displayed at the identified jump points. For example, as shown in FIGS. 2A and 2B, preview images 210-1-210-3 are displayed at the identified jump points 208-1-208-3.

Figure 6:
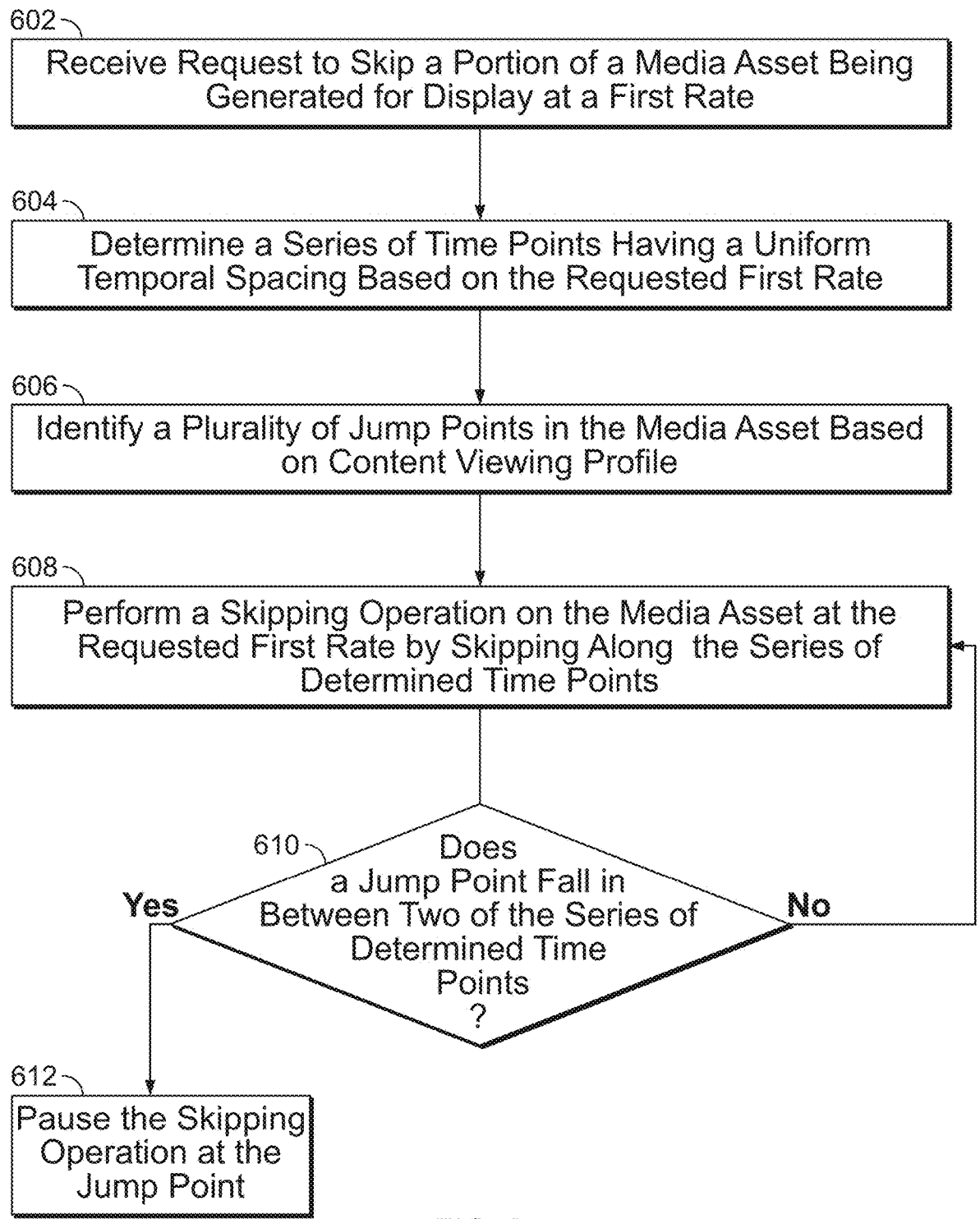
FIG. 6 depicts an illustrative flowchart of navigating to a desired play position, in accordance with disclosed methods and embodiments.

FIG. 6 depicts an illustrative flowchart 600 for navigating to a desired play position, in accordance with disclosed methods and embodiments. It should be noted that process 600 or any step thereof could be performed on, or provided by, any of the devices shown in FIG. 11 and can incorporate various user interfaces (e.g., displays screens of FIGS. 1-3). For example, process 600 may be executed by control circuitry 1128 (FIG. 11) of the user equipment 1118 and/or control circuitry of the media content item server 1102, as instructed by an application which may be implemented on media content item server 1102. In addition, one or more steps of process 600 may be incorporated into or combined with one or more steps of any other process or embodiment (e.g., process 400 of FIG. 4, process 500 of FIG. 5, process 700 of FIG. 7, process 800 of FIG. 8).

At 602, a request is received from a user to skip a portion of a media asset being generated for display at a first rate. For example, a user decides to skip a portion of an episode of Game of Thrones at a standard 2-minute skip forward rate. At 604, the system determines a series of time points having a uniform temporal spacing based on the requested first rate. For example, as illustrated in FIG. 3, a series of uniformly spaced jump points 308 are identified at 2-minute increments.

At 606, the disclosed methods and systems identify a plurality of jump points in the media asset based on a content viewing profile. For example, as discussed above in connection with FIGS. 1 and 3, a plurality of jump points 310 are identified based on the user's high level of interest in scenes featuring the location Winterfell while watching previous episodes of Game of Thrones. At 608, the system proceeds by performing a skipping operation on the media asset at the requested first rate by skipping along the series of determined time points having the uniform temporal spacing.

Figure 7:
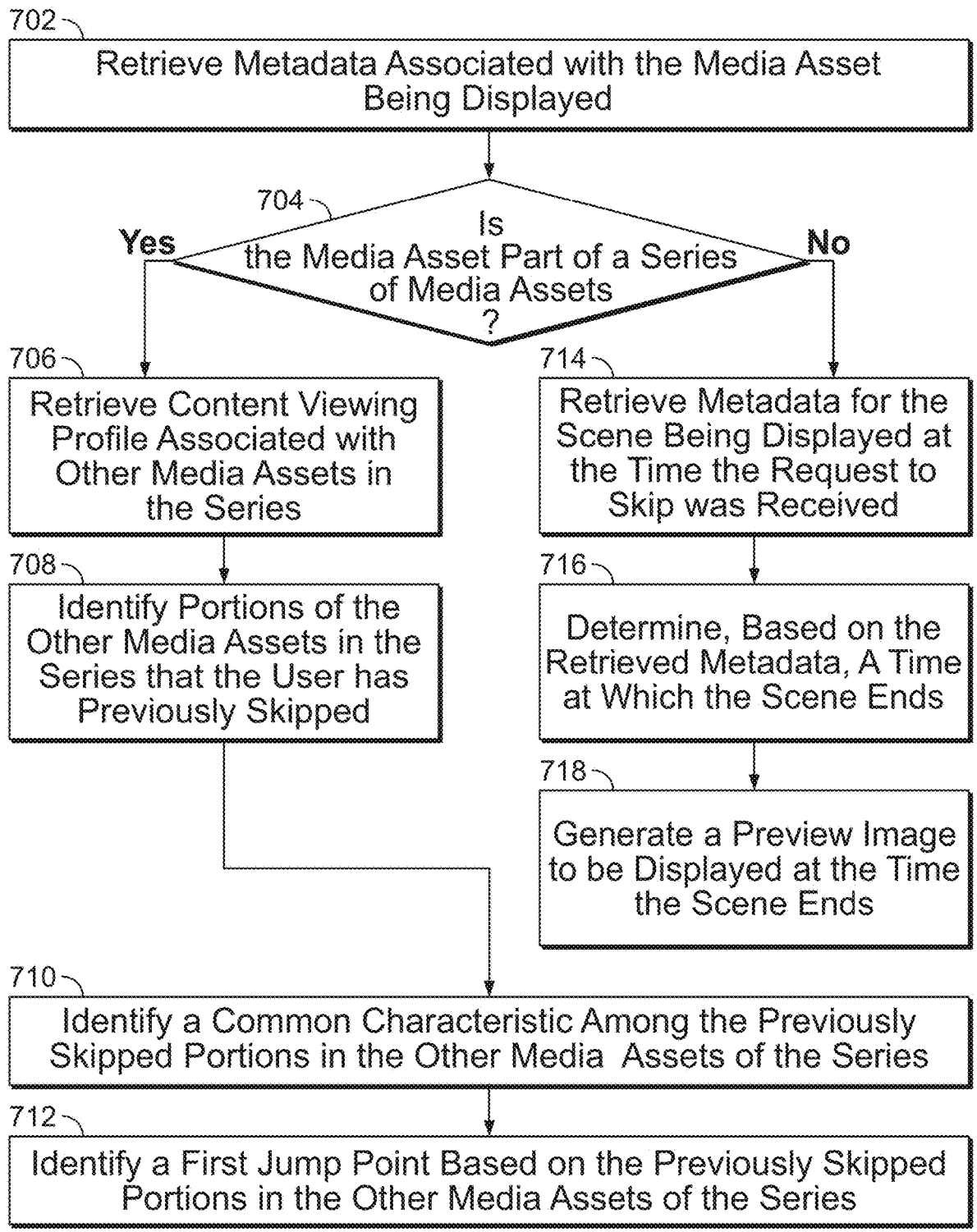
FIG. 7 depicts an illustrative flowchart of identifying jump points based on scene information, in accordance with disclosed methods and embodiments.

At 610, the system determines whether a jump point falls in between two of the series of determined time points having the uniform temporal spacing. When one of the identified jump points (for example, 310-1 in FIG. 3) falls in between two of the time points having uniform spacing (for example, between 308-2 and 308-3) (YES at 610), the process proceeds to 612 and the skipping operation is paused at the identified jump point. If, on the other hand, if there are no identified jump points falling in between two of the series of determined time points (NO at 608), the system continues performing a skipping operation on the media asset at the requested first rate by skipping along the series of determined time points having the uniform temporal spacing FIG. 7 depicts an illustrative flowchart 700 for identifying jump points based on scene information, in accordance with disclosed methods and embodiments. It should be noted that process 700 or any step thereof could be performed on, or provided by, any of the devices shown in FIG. 11 and can incorporate various user interfaces (e.g., displays screens of FIGS. 1-3). For example, process 700 may be executed by control circuitry 1128 (FIG. 11) of the user equipment 1118 and/or control circuitry of the media content item server 1102, as instructed by an application which may be implemented on media content item server 1102. In addition, one or more steps of process 700 may be incorporated into or combined with one or more steps of any other process or embodiment (e.g., process 400 of FIG. 4, process 500 of FIG. 5, process 600 of FIG. 6, process 800 of FIG. 8).

At 702, metadata associated with the media asset being displayed is retrieved. As will be discussed below in greater detail in connection with FIGS. 9 and 10, metadata may include, for instance, information related to number of frames for each scene of the media asset, genre information for each scene of the media asset, list of characters appearing in each scene, and/or location information for each scene. A person skilled in the art will understand that any number of scene related information may be stored as part of the scene metadata.

At 704, it is determined whether the media asset is part of a series. For example, if the user is viewing an episode of Game of Thrones, the system identifies whether the episode is part of a series (in this case, the series "Game of Thrones"). If it is determined that the media asset is not part of a series (NO at 704), the process moves to 714, and metadata for the scene corresponding to the current play position is retrieved. At 716, an end time of the scene is determined based on the retrieved metadata. For instance, the system calculates the end time of a scene based on the current play position and a number of frames comprising the scene (determined based on the retrieved metadata). At 718, a preview image is generated based on the end time of the scene. Specifically, a frame corresponding to the start position of the next scene may be displayed as the preview image.

If, on the other hand, it is determined that the media asset is indeed part of a series (YES at 704), the process moves to 706 where the content viewing profile associated with other media assets in the series is retrieved. For example, the system may retrieve the viewing behavior of the user while they viewed previous episodes of the series Game of Thrones. In an embodiment, the system may retrieve the viewing behavior of all members of a household using the user equipment on which the media asset is being displayed. Once the content viewing profile is retrieved, the process moves to 708 and portions of the other media asset in the series that were previously skipped over are identified. For instance, the system identifies portions of episodes in earlier seasons of Game of Thrones that the user had skipped during prior showings.

At 710, common characteristics among the previously skipped portions in the other media assets of the series are identified. For instance, the system, by analyzing the previously skipped portions within the prior episodes of Game of Thrones, may determine that scenes featuring a lot of violence are always skipped. Accordingly, at 712, the system may identify a jump point based on the identified common characteristics (which are in turn determined based on the previously skipped portions in other media assets of the series). Continuing with the Game of Thrones example, when a user presses the "skip-forward" option, the system may identify jump points (potential time points in the current episode of Game of Thrones from which the user may wish to resume consumption of the media asset) beginning from scenes which do not feature any violence.

In this manner, the system improves its ability to recommend potential time points from which the user may wish to resume consumption of the media asset in response to a skip operation request. Recommending jump points based on content viewing profile and/or scene metadata also increases the likelihood that the user will be able to resume consuming the media asset from a desired play position without having to perform multiple skip-forward and skip-backward operations to reach the desired play position.

Figure 8:
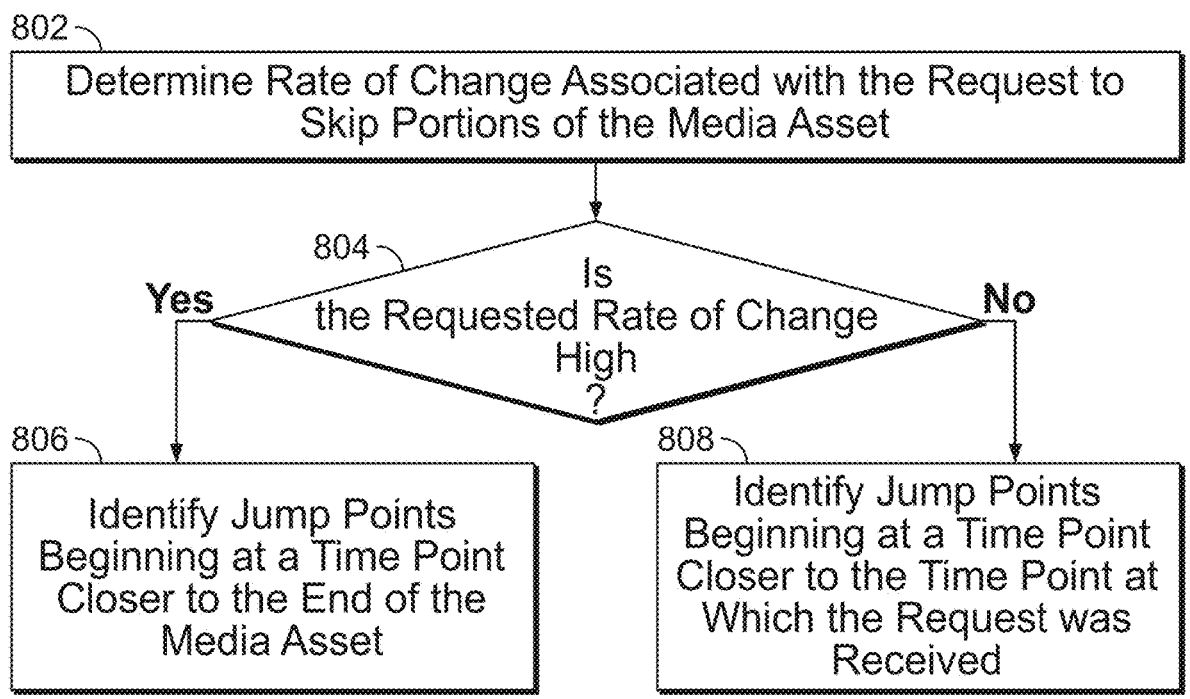
FIG. 8 depicts an illustrative flowchart of identifying jump points based on requested rate of change, in accordance with disclosed methods and embodiments.

FIG. 8 depicts an illustrative flowchart 800 for identifying jump points based on requested rate of change, in accordance with disclosed methods and embodiments. It should be noted that process 800 or any step thereof could be performed on, or provided by, any of the devices shown in FIG. 11 and can incorporate various user interfaces (e.g., displays screens of FIGS. 1-3). For example, process 800 may be executed by control circuitry 1128 (FIG. 11) of the user equipment 1118 and/or control circuitry of the media content item server 1102, as instructed by an application which may be implemented on media content item server 1102. In addition, one or more steps of process 800 may be incorporated into or combined with one or more steps of any other process or embodiment (e.g., process 400 of FIG. 4, process 500 of FIG. 5, process 600 of FIG. 6, process 700 of FIG. 7).

Step 802, the disclosed systems and methods determine the rate of change associated with the request to skip portions of the media asset. For example, the system may determine whether the user selected the 4-minute skip forward operation or the 30-second skip forward operation. At 804, the system determines whether the requested rate of change is high. In accordance with some embodiments, the system compares the requested rate of change to a predetermined threshold to determine whether the requested rate of change is high.

If the system determines that the requested rate of change is high (YES at 804), the process proceeds to 806. At 806, the process identifies jump points beginning at a time point closer to the end of the media asset. For example, as illustrated in FIG. 2B, when the requested rate of change is high (e.g., 4-minute skip forward operation), the system identifies jump points beginning at time point 208-1. If, on the other hand, the system determines that the requested rate of change is high (NO at 804), the process proceeds to 808. At 808, the process identifies jump points beginning at a time point closer to the current play position. For example, as illustrated in FIG. 2A, when the requested rate of change is low (e.g., 30-second skip forward operation), the system identifies jump points beginning at time point 208-1 close to the current play position 206.

FIGS. 9 and 10 illustrate example scene metadata including frame information, in accordance with disclosed methods and embodiments. As shown in FIG. 9, each scene 908-1-908-N includes respective metadata information. The scene metadata information includes information such as number of frames within a particular scene along with genre information associated with the respective scene. For example, scene metadata 908-1 indicates that the corresponding scene has 10 frames and is an Action sequence which scene metadata 908-5 includes only 5 frames and is a Comedy sequence. A person skilled in the art will understand that the above embodiments are merely intended to be examples, and that any number of relevant information may be stored with scene metadata 908.

In another embodiment shown in FIG. 10, each scene 1008-1-1008-N includes location information along with genre information associated with the respective scene. For example, scene metadata 1008-1 indicates that the corresponding scene is based in Winterfell and is an Action sequence which scene metadata 1008-5 is based in Dome and is a Comedy sequence. A person skilled in the art will understand that the above embodiments are merely intended to be examples, and that any number of relevant information may be stored with scene metadata 1008.

Figure 11:
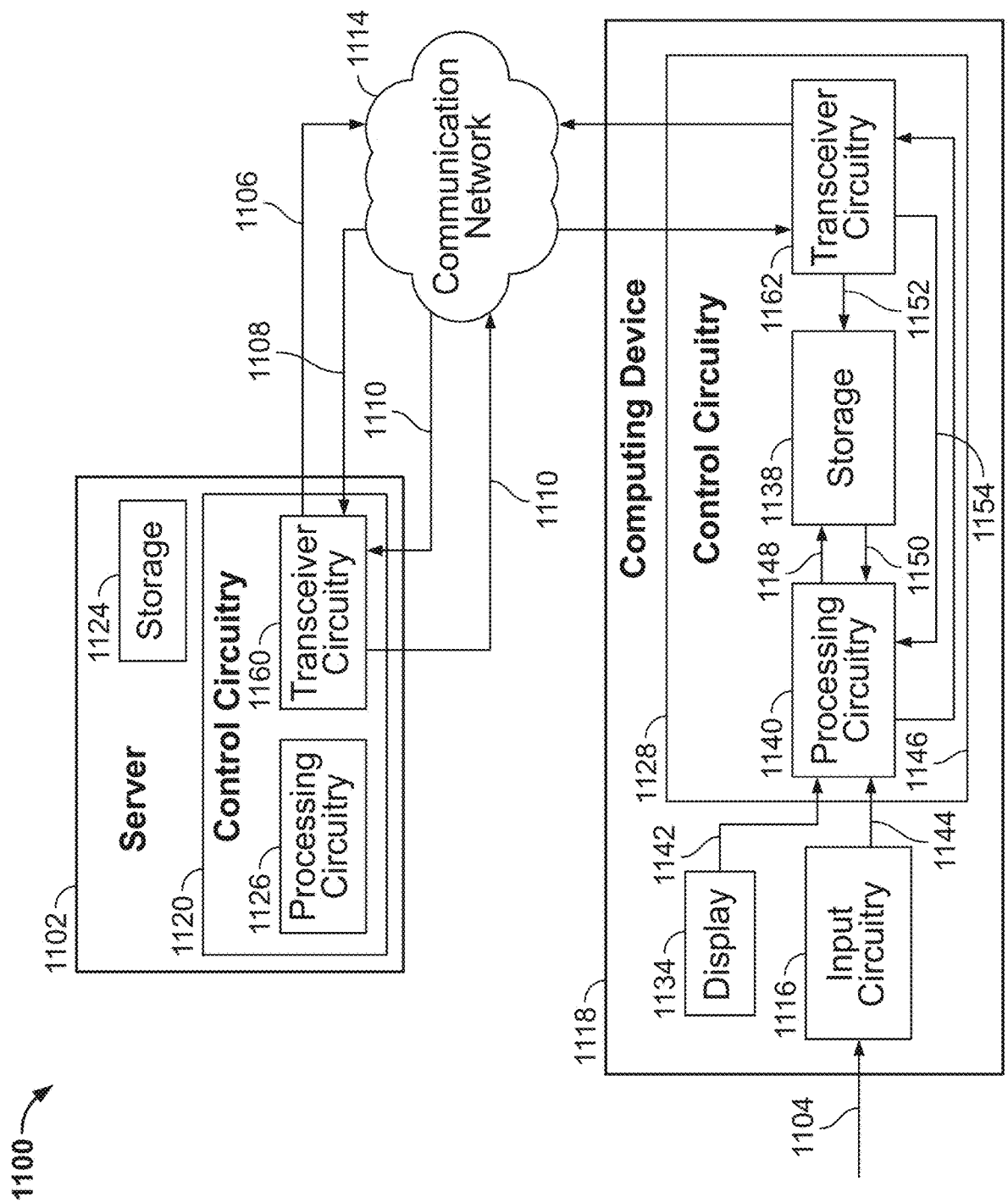
FIG. 11 is a block diagram representing devices, components of each device, and data flow therebetween for a media content skip operation system incorporating skip operation features, in accordance with some embodiments of the disclosure.

FIG. 11 is an illustrative block diagram showing a media content skip operation system incorporating skip operation features, in accordance with some embodiments of the disclosure. In FIG. 11, a media content skip operation system is configured as a media content skip operation system 1100, in accordance with some embodiments of the disclosure. In an embodiment, one or more parts of or the entirety of system 1100 may be configured as a system implementing various features, processes, and components of FIGS. 1-10. Although FIG. 11 shows a certain number of components, in various examples, system 1100 may include fewer than the illustrated number of components and/or multiples of one or more of the illustrated number of components.

System 1100 is shown to include a computing device 1118, a server 1102 and a communication network 1114. It is understood that while a single instance of a component may be shown and described relative to FIG. 11, additional instances of the component may be employed. For example, server 1102 may include, or may be incorporated in, more than one server. Similarly, communication network 1114 may include, or may be incorporated in, more than one communication network. Server 1102 is shown communicatively coupled to computing device 1118 through communication network 1114. While not shown in FIG. 11, server 1102 may be directly communicatively coupled to computing device 1118, for example, in a system absent or bypassing communication network 1114.

Communication network 1114 may comprise one or more network systems, such as, without limitation, an Internet, LAN, WIFI or other network systems suitable for audio processing applications. In some embodiments, system 1100 excludes server 1102, and functionality that would otherwise be implemented by server 1102 is instead implemented by other components of system 1100, such as one or more components of communication network 1114. In still other embodiments, server 1102 works in conjunction with one or more components of communication network 1114 to implement certain functionality described herein in a distributed or cooperative manner. Similarly, in some embodiments, system 1100 excludes computing device 1118, and functionality that would otherwise be implemented by computing device 1118 is instead implemented by other components of system 1100, such as one or more components of communication network 1114 or server 1102 or a combination. In still other embodiments, computing device 1118 works in conjunction with one or more components of communication network 1114 or server 1102 to implement certain functionality described herein in a distributed or cooperative manner.

Computing device 1118 includes control circuitry 1128, display 1134 and input circuitry 1116. Control circuitry 1128 in turn includes transceiver circuitry 1162, storage 1138 and processing circuitry 1140. In some embodiments, computing device 1118 or control circuitry 1128 may be configured as media devices 102, 202, or 302 of FIGS. 1, 2, and 3, respectively.

Server 1102 includes control circuitry 1120 and storage 1124. Each of storages 1124 and 1138 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 1124, 1138 may be used to store various types of content, metadata, and or other types of data. Non-volatile memory may also be used (e.g., to launch a boot-up routine and other instructions). Cloud-based storage may be used to supplement storages 1124, 1138 or instead of storages 1124, 1138. In some embodiments, retrieved content viewing profile and/or scene metadata may be stored in one or more of storages 1112, 1138.

In some embodiments, control circuitry 1120 and/or 1128 executes instructions for an application stored in memory (e.g., storage 1124 and/or storage 1138). Specifically, control circuitry 1120 and/or 1128 may be instructed by the application to perform the functions discussed herein. In some implementations, any action performed by control circuitry 1120 and/or 1128 may be based on instructions received from the application. For example, the application may be implemented as software or a set of executable instructions that may be stored in storage 1124 and/or 1138 and executed by control circuitry 1120 and/or 1128. In some embodiments, the application may be a client/server application where only a client application resides on computing device 1118, and a server application resides on server 1102.

The application may be implemented using any suitable architecture. For example, it may be a stand-alone application wholly implemented on computing device 1118. In such an approach, instructions for the application are stored locally (e.g., in storage 1138), and data for use by the application is downloaded on a periodic basis (e.g., from an out-of-band feed, from an Internet resource, or using another suitable approach). Control circuitry 1128 may retrieve instructions for the application from storage 1138 and process the instructions to perform the functionality described herein. Based on the processed instructions, control circuitry 1128 may determine a type of action to perform in response to input received from input circuitry 1116 or from communication network 1114. For example, in response to a user selection of skip-backward or skip-forward operation, control circuitry 1128 may perform the steps of process 400 (FIG. 4), process 500 (FIG. 5), process 600 (FIG. 6), process 700 (FIG. 7), process 800 (FIG. 8) or processes relative to various embodiments, such as the example of FIGS. 1, 2, and 3.

In client/server-based embodiments, control circuitry 1128 may include communication circuitry suitable for communicating with an application server (e.g., server 1102) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1114). In another example of a client/server-based application, control circuitry 1128 runs a web browser that interprets web pages provided by a remote server (e.g., server 1102). For example, the remote server may store the instructions for the application in a storage device. The remote server may process the stored instructions using circuitry (e.g., control circuitry 1128) and/or generate displays. Computing device 1118 may receive the displays generated by the remote server and may display the content of the displays locally via display 1134. This way, the processing of the instructions is performed remotely (e.g., by server 1102) while the resulting displays, such as the display windows described elsewhere herein, are provided locally on computing device 1118. Computing device 1118 may receive inputs from the user via input circuitry 1116 and transmit those inputs to the remote server for processing and generating the corresponding displays. Alternatively, computing device 1118 may receive inputs from the user via input circuitry 1116 and process and display the received inputs locally, by control circuitry 1128 and display 1134, respectively.

Server 1102 and computing device 1118 may transmit and receive content and data such as media content via communication network 1114. For example, server 1102 may be a media content provider, and computing device 1118 may be a smart television configured to download or stream media content, such as a Harry Potter episode, from server 1102. Control circuitry 1120, 1128 may send and receive commands, requests, and other suitable data through communication network 1114 using transceiver circuitry 1160, 1162, respectively. Control circuitry 1120, 1128 may communicate directly with each other using transceiver circuits 1160, 1162, respectively, avoiding communication network 1114.

It is understood that computing device 1118 is not limited to the embodiments and methods shown and described herein. In nonlimiting examples, computing device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Control circuitry 1120 and/or 1118 may be based on any suitable processing circuitry such as processing circuitry 1126 and/or 1140, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1120 and/or control circuitry 1118 are configured to implement a media content operation system, such as systems, or parts thereof, that perform various media content manipulation processes described and shown in connection with FIGS. 4-8 and/or systems carrying out the features described and shown relative to FIGS. 1-3.

Computing device 1118 receives a user input 1104 at input circuitry 1116. For example, computing device 1118 may receive a user input like a user swipe or user touch, as previously discussed. In some embodiments, computing device 1118 is a media device (or player) configured as media devices 102, 202, or 302, with the capability to access media content. It is understood that computing device 1118 is not limited to the embodiments and methods shown and described herein. In nonlimiting examples, computing device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1104 may be received from a user selection-capturing interface that is separate from device 1118, such as a remote control device, trackpad or any other suitable user movement sensitive or capture devices, or as part of device 1118, such as a touchscreen of display 1134. Transmission of user input 1104 to computing device 1118 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 1116 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 1140 may receive input 1104 from input circuit 1116. Processing circuitry 1140 may convert or translate the received user input 1104 that may be in the form of gestures or movement to digital signals. In some embodiments, input circuit 1116 performs the translation to digital signals. In some embodiments, processing circuitry 1140 (or processing circuitry 1126, as the case may be) carries out disclosed processes and methods. For example, processing circuitry 1140 or processing circuitry 1126 may perform processes 400, 500, 600, 700, and 800 of FIGS. 4-8, respectively.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, via control circuitry, a request to skip a portion of a media asset being generated for display;
   identifying, via the control circuitry, a plurality of jump points in the media asset indicative of potential time points from which to resume consumption of the media asset, wherein the plurality of identified jump points comprises:
      a first jump point identified based on a content viewing profile; and
      a second jump point identified based on a scene information associated with the media asset; and
      wherein the second jump point is identified by:
         retrieving, via the control circuitry, scene metadata associated with a scene being displayed at a first time point when the request to skip the portion of the media asset being generated for display is received;
         determining, based on the retrieved scene metadata, a second time point when the scene is scheduled to end; and
         determining, based on the determined second time point, the second jump point;
   generating for display, via the control circuitry, a progress bar indicating the plurality of identified jump points.

2. The method of claim 1, further comprising:
   generating, via the control circuitry, a respective preview image associated with each of the identified jump points; and
   generating for display, via the control circuitry, the respective preview image associated with each of the identified jump points on the progress bar.

3. The method of claim 2, wherein generating the respective preview image associated with each of the identified jump points comprises:
   selecting a frame of the media asset corresponding to the identified jump point; and
   displaying the selected frame as the preview image.

4. The method of claim 1, wherein the first jump point is visually distinguished from the second jump point on the progress bar.

5. The method of claim 1, further comprising:
   generating, via the control circuitry, a respective preview video clip associated with each of the identified jump points; and
   generating for display, via the control circuitry, the respective preview video clip associated with each of the identified jump points on the progress bar.

6. The method of claim 1, wherein identifying the first jump point based on the content viewing profile comprises:
   retrieving, via the control circuitry, the content viewing profile of a user making the request;
   determining, via the control circuitry, one or more user preferences based on the retrieved content viewing profile; and
   identifying, via the control circuitry, the first jump point based on the determined one or more user preferences.

7. The method of claim 6, wherein determining one or more user preferences based on the retrieved content viewing profile comprises:
   determining one of a genre, an actor, or a scene of interest to the user.

8. The method of claim 6, wherein the media asset is a part of a series of media assets; and
   wherein retrieving the content viewing profile comprises:
      retrieving, via the control circuitry, the content viewing profile associated with other media assets of the series of media assets.

9. The method of claim 1, wherein the second jump point precedes the second time point.

10. A system comprising:
    an input circuit configured to detect an input request to skip a portion of a media asset being generated for display; and
    control circuitry configured to:
       identify a plurality of jump points in the media asset indicative of potential time points from which to resume consumption of the media asset, wherein the plurality of identified jump points comprises:
          a first jump point identified based on a content viewing profile; and
          a second jump point identified based on a scene information associated with the media asset; and
          wherein the control circuitry, when identifying the second jump point, is further configured to:
             retrieve, via the control circuitry, scene metadata associated with a scene being displayed at a first time point when the request to skip the portion of the media asset being generated for display is received;
             determine, based on the retrieved scene metadata, a second time point when the scene is scheduled to end; and
             determine, based on the determined second time point, the second jump point;
       generate a progress bar indicating the plurality of identified jump points.

11. The system of claim 10, wherein the control circuitry is further configured to:
    generate a respective preview image associated with each of the identified jump points; and
    generate for display the respective preview image associated with each of the identified jump points on the progress bar.

12. The system of claim 11, wherein the control circuitry, when generating the respective preview image associated with each of the identified jump points, is further configured to:
  select a frame of the media asset corresponding to the identified jump point; and
  display the selected frame as the preview image.

13. The system of claim 10, wherein the first jump point is visually distinguished from the second jump point on the progress bar.

14. The system of claim 10, wherein the control circuitry is further configured to:
  generate a respective preview video clip associated with each of the identified jump points; and
  generate for display the respective preview video clip associated with each of the identified jump points on the progress bar.

15. The system of claim 10, wherein the control circuitry, when identifying the first jump point based on the content viewing profile, is configured to:
  retrieve the content viewing profile of a user making the request;
  determine one or more user preferences based on the retrieved content viewing profile; and
  identify the first jump point based on the determined one or more user preferences.

16. The system of claim 15, wherein the control circuitry, when determining one or more user preferences based on the retrieved content viewing profile, is further configured to:
  determine one of a genre, an actor, or a scene of interest to the user.

17. The system of claim 15, wherein the media asset is a part of a series of media assets; and
  wherein the control circuitry, when retrieving the content viewing profile, is configured to:
    retrieve the content viewing profile associated with other media assets of the series of media assets.

18. The system of claim 10, wherein the second jump point precedes the second time point.

* * * * *

UNITED STATES PATENT AND TRADEMARK OFFICE
CERTIFICATE OF CORRECTION

PATENT NO. : 11,184,675 B1
APPLICATION NO. : 16/897614
DATED : November 23, 2021
INVENTOR(S) : Ankur Anil Aher et al.

It is certified that error appears in the above-identified patent and that said Letters Patent is hereby corrected as shown below:

In the Specification

Column 2, Line 24, delete "Dome" and add --Dorne--.

Column 2, Line 26, delete "Dome" and add --Dorne--.

Column 2, Line 29, delete "Dome" and add --Dorne--.

Column 2, Line 34, delete "Dome" and add --Dorne--.

Column 2, Line 36, delete "Dome" and add --Dorne--.

Column 2, Line 46, delete "Dome" and add --Dorne--.

Column 4, Line 45, delete "Dome" and add --Dorne--.

Column 6, Line 46, delete "Dome" and add --Dorne--.

Column 11, Line 23, delete "Dome" and add --Dorne--.

Signed and Sealed this
Ninth Day of August, 2022

Katherine Kelly Vidal
*Director of the United States Patent and Trademark Office*